(12) United States Patent
Liao et al.

(10) Patent No.: US 11,966,819 B2
(45) Date of Patent: Apr. 23, 2024

(54) TRAINING CLASSIFIERS IN MACHINE LEARNING

(71) Applicant: INTERNATIONAL BUSINESS MACHINES CORPORATION, Armonk, NY (US)

(72) Inventors: Qingzi Liao, White Plains, NY (US); Yunfeng Zhang, Chappaqua, NY (US); Michael Desmond, White Plains, NY (US); Rachel Katherine Emma Bellamy, Bedford, NY (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 16/703,371

(22) Filed: Dec. 4, 2019

(65) Prior Publication Data

US 2021/0174239 A1 Jun. 10, 2021

(51) Int. Cl.
*G06N 20/00* (2019.01)
(52) U.S. Cl.
CPC ............................... *G06N 20/00* (2019.01)
(58) Field of Classification Search
CPC ..................................................... G06N 20/00
See application file for complete search history.

(56) References Cited

U.S. PATENT DOCUMENTS

| | | | |
|---|---|---|---|
| 5,675,710 A | 10/1997 | Lewis | |
| 7,366,705 B2 | 4/2008 | Zeng et al. | |
| 9,779,081 B2 | 10/2017 | Simard et al. | |
| 10,068,174 B2 | 9/2018 | Aili et al. | |
| 2007/0244690 A1 | 10/2007 | Peters | |
| 2016/0098645 A1 | 4/2016 | Sharma et al. | |
| 2016/0292641 A1* | 10/2016 | Liu | G06Q 50/01 |
| 2018/0268319 A1* | 9/2018 | Guo | G06N 5/04 |
| 2020/0396129 A1* | 12/2020 | Tedaldi | H04L 41/32 |

OTHER PUBLICATIONS

Task Generator: An Engine for Generating Tasks that Direct Users Towards Better Document Classification, IP.com, IPCOM000225063D, Jan. 23, 2013, 7 pages.
Mell, Peter et al.; "The NIST Definition of Cloud Computing;" National Institute of Standards and Technology; Special Publication 800-145; Sep. 2011; 7 pages.
Bilenko et al., "Integrating Constraints and Metric Learning in Semi-Supervised Clustering," pp. 81-88, 2004.
Smith et al. (Mar. 2018). Closing the Loop: User-Centered Design and Evaluation of a Human-in-the-Loop Topic Modeling System. In 23rd International Conference on Intelligent User Interfaces (pp. 293-304). ACM.

(Continued)

*Primary Examiner* — Nicholas P Celani
(74) *Attorney, Agent, or Firm* — Schmeiser, Olsen & Watts, LLP; Stosch Sabo

(57) ABSTRACT

An approach is provided for training classifiers used in machine learning. A corpus of training data is received. One or more clusters of the training data is generated according to features of the training data. The one or more clusters are refined using user-specified rules. One or more classifiers are trained for use in machine learning based upon the refined one or more clusters.

17 Claims, 6 Drawing Sheets

(56) References Cited

OTHER PUBLICATIONS

Hoque et al. (Mar. 2015). Convisit: Interactive topic modeling for exploring asynchronous online conversations. In Proceedings of the 20th International Conference on Intelligent User Interfaces (pp. 169-180). ACM.
Choo et al., "UTOPIAN: User-Driven Topic Modeling Based on Interactive Nonnegative Matrix Factorization," IEEE Trans. Vis. Comput. Graph., vol. 19, No. 12, 10 pages, Dec. 2013.
Wagstaff et al. (2000). Clustering with instance-level constraints. AAAI/IAAI, 1097, 577-584.
Hu et al. (Mar. 2011). Interactive feature selection for document clustering. In Proceedings of the 2011 ACM Symposium on Applied Computing (pp. 1143-1150). ACM.
Ratner et al. (2017). Snorkel: Rapid training data creation with weak supervision. Proceedings of the VLDB Endowment, 11(3), 269-282.
Ratner et al. (2016). Data programming: Creating large training sets, quickly. In Advances in neural information processing systems (pp. 3567-3575).
Rashidi et al. (Aug. 2011). Ask me better questions: active learning queries based on rule induction. In Proceedings of the 17th ACM SIGKDD international conference on Knowledge discovery and data mining (pp. 904-912). ACM.
Druck et al. (Aug. 2009). Active learning by labeling features. In Proceedings of the 2009 Conference on Empirical Methods in Natural Language Processing: vol. 1-vol. 1 (pp. 81-90). Association for Computational Linguistics.

* cited by examiner

TRAINING CLASSIFIERS IN MACHINE LEARNING

TECHNICAL FIELD

The present invention relates to systems and methods for training classifiers in machine learning processes. More specifically, the invention relates to systems and methods for defining classes and training classifiers by employing flexible rules to update and refine clusters.

BACKGROUND

Classification in machine learning is a process of predicting the class of a given set of data objects or data points. A classifier utilizes some training data to understand how given input variables relate to a class. It is a common task in machine learning to use labeled corpuses of data objects to train classifiers. There are limitations with this training classifiers in this way. For example, labeling each data object as a positive or negative example is labor intensive. Further, classes are often defined by manual specification, and can only focus on a subset of groups. Clustering algorithms are often used to discover main groups in a corpus to assist defining classes. Disadvantageously, objects in a cluster are too noisy to be directly used as training examples. Thus, new methods are needed for defining and training classifiers efficiently in a single process.

SUMMARY

An embodiment of the present invention relates to a method, and associated computer system and computer program product for training classifiers used in machine learning. One or more processors of a computer system receive a corpus of training data. The one or more processors of the computer system generate one or more clusters of the training data according to features of the training data. The one or more processors refine the one or more clusters using user-specified rules. The one or more processors train one or more classifiers for use in machine learning based upon the refined one or more clusters.

The aforementioned embodiment advantageously provides users a way to quickly build classifiers that have good coverage of groups or concepts in a domain. The embodiment improves the time efficiency and reduces the effort needed for discovering groups and labeling data. The present invention may be applicable to provide good coverage of classifiers in applications such as chatbots, news aggregators, product recommendations and the like. The embodiment advantageously allows a user to identify a noisy cluster with a definition and provide rules to refine examples in or out of the cluster based on user needs, to be used as training data.

In one optional aspect of the aforementioned embodiment, the refining further includes interacting with a user with a cluster refining rule elicitation module, where the user-specified rules are authored by the user. In another optional embodiment, the refining further includes interacting with a user with a cluster refining rule elicitation module, where the user-specified rules are automatically extracted and suggested to users for selection, confirmation and editing. In still another optional embodiment, the refining includes interacting with a user with a cluster refining rule elicitation module, where the user-specified rules are elicited case-based. In still another optional embodiment, the refining further includes assigning subsets of the corpus of training data in or out of clusters of the one or more cluster sing the user-specified rules, and using a voting algorithm or a generative model to resolve conflicts in the assigning. In still another optional embodiment, the refining and the training are implemented by the one or more processors of the computer system in a single process. In still another optional embodiment, the one or more clusters represent classes of the training data.

DETAILED DESCRIPTION

The present invention overcomes drawbacks in the present art. For example, the present art does not support user input to refine clusters through automatic and unsupervised clustering methods. Thus, prior art systems and methods require a user to carefully examine and edit each object in a cluster to refine it. Further, prior art methods rely on pre-defining classes, and do not discover classes from a corpus.

Embodiments of the present invention advantageously provide users a way to quickly build classifiers that have good coverage of groups or concepts in a domain. The present invention improves the time efficiency and reduces the effort needed for discovering groups and labeling data. The present invention may be applicable to provide good coverage of classifiers in applications such as chatbots, news aggregators, product recommendations and the like. The present invention advantageously allows a user to identify a noisy cluster with a definition and provide rules to refine examples in or out of the cluster based on user needs, to be used as training data. These user inputted rules may optionally allow the user to choose the number of clusters, or customize merge, remove or split policies regarding clusters. The present invention may further advantageously deploy user-specified rules to update clusters. These rules may be more efficient and more flexible in supervising cluster updating than labeling each data object. Thus the systems and methods described herein may intelligently optimize the kinds of rules to elicit or otherwise suggest.

Advantageously, embodiments of the present invention may efficiently define and finish training multiple classes that cover main groups or concepts in a domain with a single process. The systems and methods described herein may be applied to any kind of clustering algorithms and classification algorithms. Embodiments of the present invention further advantageously provide flexibility to take user input to fine-tune training data for classes. Further, systems and methods described herein may intelligently elicit rules through various interactions, reduce, effort and errors in machine learning.

Figure 1:
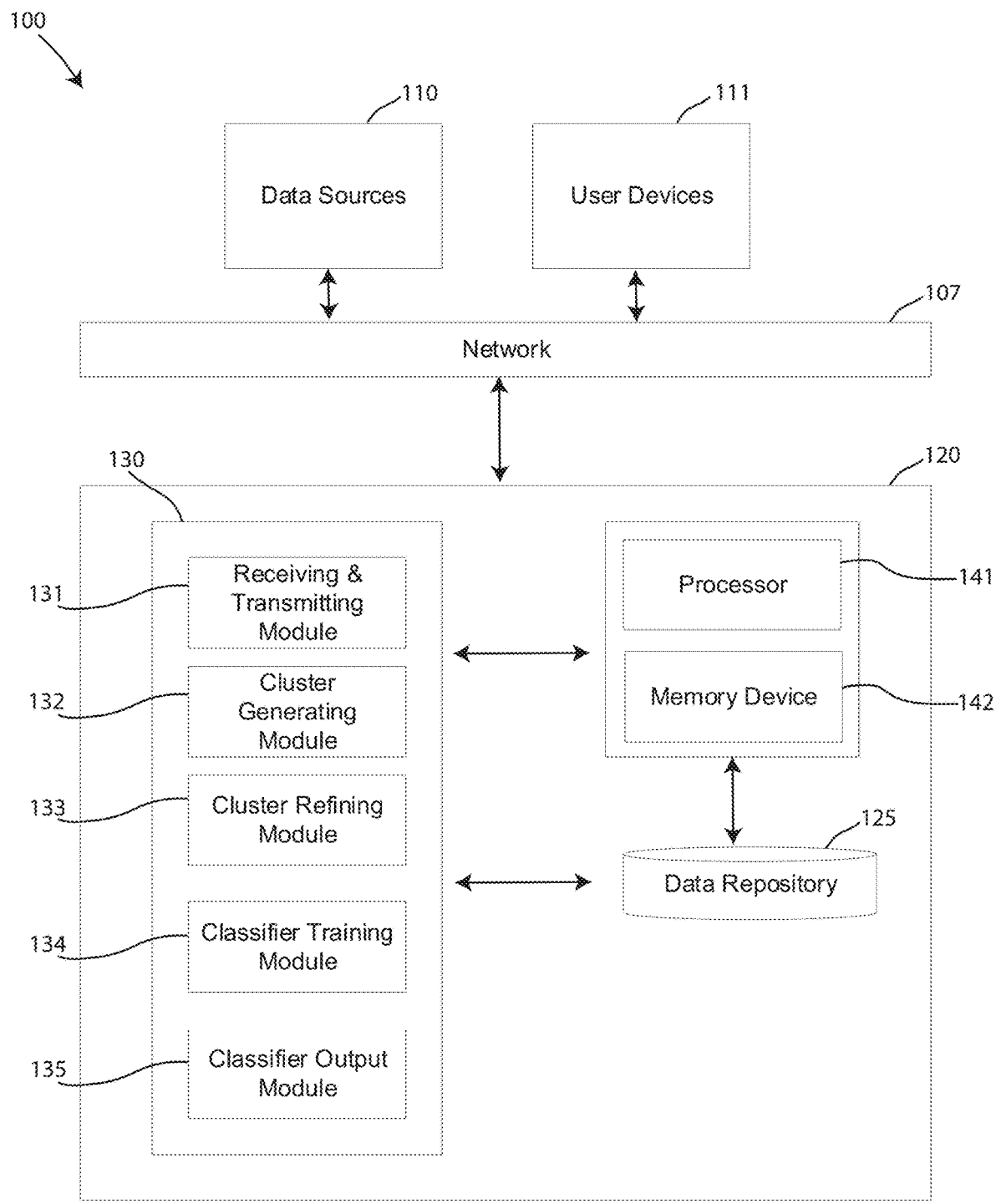
FIG. 1 depicts a block diagram of a system for training classifiers used in machine learning, in accordance with embodiments of the present invention.

FIG. 1 depicts a block diagram of a system for training classifiers used in machine learning 100, in accordance with embodiments of the present invention. Embodiments of the system for training classifiers used in machine learning 100 may be conducted by a computer system 120. Embodiments of the computing system 120 may be a computer system, a compute a server, one or more servers, a cloud computing device, a hardware device, a remote server, and the like. The system for training classifiers used in machine learning 100 and/or computer system 120 may be configured to receive a corpus of training data and generate clusters of training data according to features of the training data. The system for training classifiers used in machine learning 100 and/or computer system 120 may further be configured to refine the clusters using user-specified rules and train classifiers for use in machine learning based upon the refined clusters.

Furthermore, embodiments of system for training classifiers used in machine learning 100 may include one or more data sources 110 and one or more user devices 111 communicatively coupled to the computing system 120 of the system for training classifiers used in machine learning 100 over a network 107.

The network 107 may be a 4G, 5G and/or LTE based cellular data network or system. The network 107 may be a cloud network or system. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

Embodiments of the one or more data sources 110 of the system for training classifiers used in machine learning 100 may be any document corpus provided by a user, entity of other system. The one or more data sources 110 may be text data in a single language or multiple languages. The one or more data sources 110 may be configured to provide the computer system 120 with one or more large or structured set of texts. For example, the one or more data sources 110 may be a web entity. The one or more data sources 110 may be an academic journal database, a historical newspaper database, or any other database with textual data. The one or more data sources 110 may be configured to provide some or all of the data stored therein. For example, the one or more data sources 110 may be interacted with by a user to determine the exact subset of data from the one or more data sources 110 to provide to the computer system 120.

Embodiments of the one or more user devices 111 may be a device operated by a user that is configured to interact with the computer system 120 and both provide information or inputs to the computer system 120 and receive outputs from the computer system 120. The one or more user devices 111 may be operated by a user in providing data from the one or more data sources 110 to the computer system 120 for analysis therein, in accordance with the methods described herein.

The one or more user devices 111 may be configured to provide user interactions to the computer system 120 over the network 107. These interactions may be, for example, providing cluster definitions to the computer system 120 based on user needs, or providing rules to the computer system 120 regarding assignment of labels for examples on whether the examples fall in or out of a cluster. The one or more user devices 111 may be interacted with by the computer system 120 in the form of the computer system 120 suggesting rules for the one or more user devices 111 to confirm or disconfirm, and/or edit. The one or more user devices 111 may be configured to provide case-based rules to the computer system 120.

The one or more user devices 111 may be configured to provide the computer system 120 with a selected subset of data from the data that has been provided to the computer system 120 from the one or more data sources 110. For example, the one or more user devices 111, operated by a user, may be configured to provide the computer system 120 with a corpus of 300,000 technology notes from a technology journal database. The one or more user devices 111 may further be configured to receive an outputted classifier from the computer system 120 based on the methods described herein.

Embodiments of the computing system 120 include a module structure 130 that includes a receiving and transmitting module 131, a cluster generating module 132, a cluster refining module 133, a classifier training module 134, and a classifier output module 135. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving and transmitting module 131 may include one or more components of hardware and/or software program code for receiving and/or transmitting information and/or data from the one or more data sources 110 and the one or more user devices 111. The receiving and transmitting module 131 is configured to provide and interface for the interactions between the computer system 120 and the one or more user devices 111 and the one or more data sources 110. The receiving and transmitting module 131 may be configured to receive a corpus of training data, such as a corpus of documents, text, images, historical records, or the like, from the one or more data sources 110. The receiving and transmitting module 131 may further be configured to receive cluster definitions from the one or more user devices 111 based on user needs, or receive rules to from the one or more user devices 111 regarding assignment of labels for examples on whether the examples fall in or out of a cluster. The one or more user devices 111 may be interacted with by the computer system 120 via the receiving and transmitting module 131 providing suggested rules for the one or more user devices 111 to confirm or disconfirm, and/or edit. The receiving and transmitting module 131 may be configured to receive case-based rules from the one or more user devices 111. For example, the receiving and transmitting module 131 may provide specific examples to the one or more user devices 111 and ask the user rules that are embodied in the example, and receive these rules from the one or more user devices 111.

Embodiments of the cluster generating module 132 may include one or more components of hardware and/or software program code for generating clusters from training data received by the receiving and transmitting module 131 based on features of the received training data. The cluster generating module 132 may include any type of clustering algorithm(s) to suggest or otherwise create clusters for main groups or concepts from the received corpus of training data. The cluster generating module 132 may allow for clusters to be defined based on user needs, including user determination for the number of clusters, cluster splitting, cluster merging and cluster removing. The cluster generating module 132 may be configured to discover main groups in the received corpus of training data.

Embodiments of the cluster refining module 133 may include one or more components of hardware and/or software program code for refining or otherwise update clusters generated by the cluster generating module 132. The cluster refining module 133 may include one or more elicitation sub-modules for collecting rules for adding examples or objects from the corpus of training data into clusters.

The cluster refining module 133 may thus be configured to interact with a user to collect rules for refining examples in or out of a cluster so that the computer system can automatically update the examples in each cluster based on the collected rules. For example, the cluster refining module 133 may include an elicitation sub-module configured to interact with a user to automatically extract and receive input from the user as to user-specified rules. In this embodiment, the cluster refining module 133 may utilize the receiving and transmitting module 131 to send or otherwise suggest rules to a user to select, confirm, disconfirm, edit or the like. For example, the cluster refining module 133 may suggest the most frequent keywords or patterns in a cluster. The user may then confirm or disconfirm the rule "if a document contains this keyword, it should be in the cluster" or "if an image contains this pixel pattern, it should be in the cluster." The cluster refining module 133 may automatically discover sub-groups in a cluster and extract rules and common patterns of the sub-groups for the user to select, confirm, disconfirm, edit or the like. The cluster refining module 133 may further be configured to compare neighboring clusters and extract differentiating rules or boundary rules.

The cluster refining module 133 may be configured to directly ask the user to author rules, in some embodiments. For example, the cluster refining module 133 may be configured to first ask the user to pinpoint the definition of a concept or group represented by the cluster, then provide positive or negative rules for the concept or group. For multiple clusters that are potentially close (based on distance or similarity measures), the cluster refining module 133 may ask the user to pinpoint or otherwise provide definitions, and further provide boundary rules. The form of rules authored by a user and received and processed by the cluster refining module 133 may be flexible. If the corpus of samples are text documents, rules may be keywords, keyword relations (e.g. if the text includes word A but not B), parts of words, entity type, sematic relationships or the like. If the corpus of samples are images, they can be any kind of areas, objects or relations of objects in the image(s).

Still further contemplated, the cluster refining module 133 may be configured to interact with a user and elicit case-based rules. In this case, a "case-based" is when the cluster refining module 133 asks the user to identify rules that are embodied in an example. The cluster refining module 133 may make a random selection, and then may ask the user if this should be a positive or negative example, and then ask the user for the rationale for the answer. For example, if the user states "this document should be in the sports news cluster because it is talking about a basketball game", the cluster refining module 133 may extract the rule "if mentioning basketball, then put the example in the sports news cluster." In another embodiment, the cluster refining module 133 may select a boundary case in a cluster. A boundary case may be a case that is the most different from other cases. Alternatively, the cluster refining module 133 may select a case that is close to a neighboring cluster. In either case, the cluster refining module 133 may as the user to identify the boundary rules embodied in the case. For example, a boundary rule may be "Reporting on an actor should usually be in the entertainment news cluster, but this example is about the actor's political campaign so the example should be in the political news cluster."

After collecting all the rules for a cluster, cluster refining module 133 may be configured to assign each examples in the corpus to be in or out of a given cluster based on the elicited rules. In the case of a conflict, the cluster refining module 133 may be configured to use a voting algorithm or a generative model to resolve conflicts in the assigning. Examples of a voting algorithm or weighing model may include allowing a user to manually set the weighing methods (i.e. give one type of rules higher weights and another lower weights).

The cluster refining module 133 may be configured to be utilized iteratively by the module structure 130 and/or computer system 120 to continue to update and refine clusters until a user is satisfied with a training outcome. Thus, the cluster refining module 133 may allow users to make modifications of rules, or may provide users with the same rule extraction process to allow users to respond differently. In some embodiments, the cluster refining module 133 may iteratively become increasingly specific in rules with each iterative refining process. In other embodiments, the cluster refining module 133 may simply obtain different classification results by eliciting different rule responses from users.

Embodiments of the classifier training module 134 may include one or more components of hardware and/or software program code for training classifiers based on the refined clusters created by the cluster refining module 133. The training classifier module 134 may thus be configured to build classifiers that have good coverage of groups or concepts in a domain based on the clusters creating the user-specified rules created by the cluster refining module 133. These classifiers may be trained for various applications, such as chatbot applications, news aggregator applications, product recommendation applications, and the like. The classifier training module 134 may include any kind of classification algorithm. This classifier training and duster refining provided by the cluster refining module 133 and the classifier training module 134 may occur in a single process.

Embodiments of the classifier output module 135 may include one or more components of hardware and/or software program code for outputting trained classifiers to users of the system for training classifiers used in machine learning 100 and/or the user devices 111. The trained classifiers output by the classifier output module 135 may provide classifiers with good coverage of the domain of the corpus of examples.

Further, embodiments of the computing system 120 may be equipped with a memory device 142 which may store various data/information/code, and a processor 141 for implementing the tasks associated with the system for signaling concept drift during knowledge base population 100 and perform processing associated with the functionality of the module structure 130.

Figure 2:
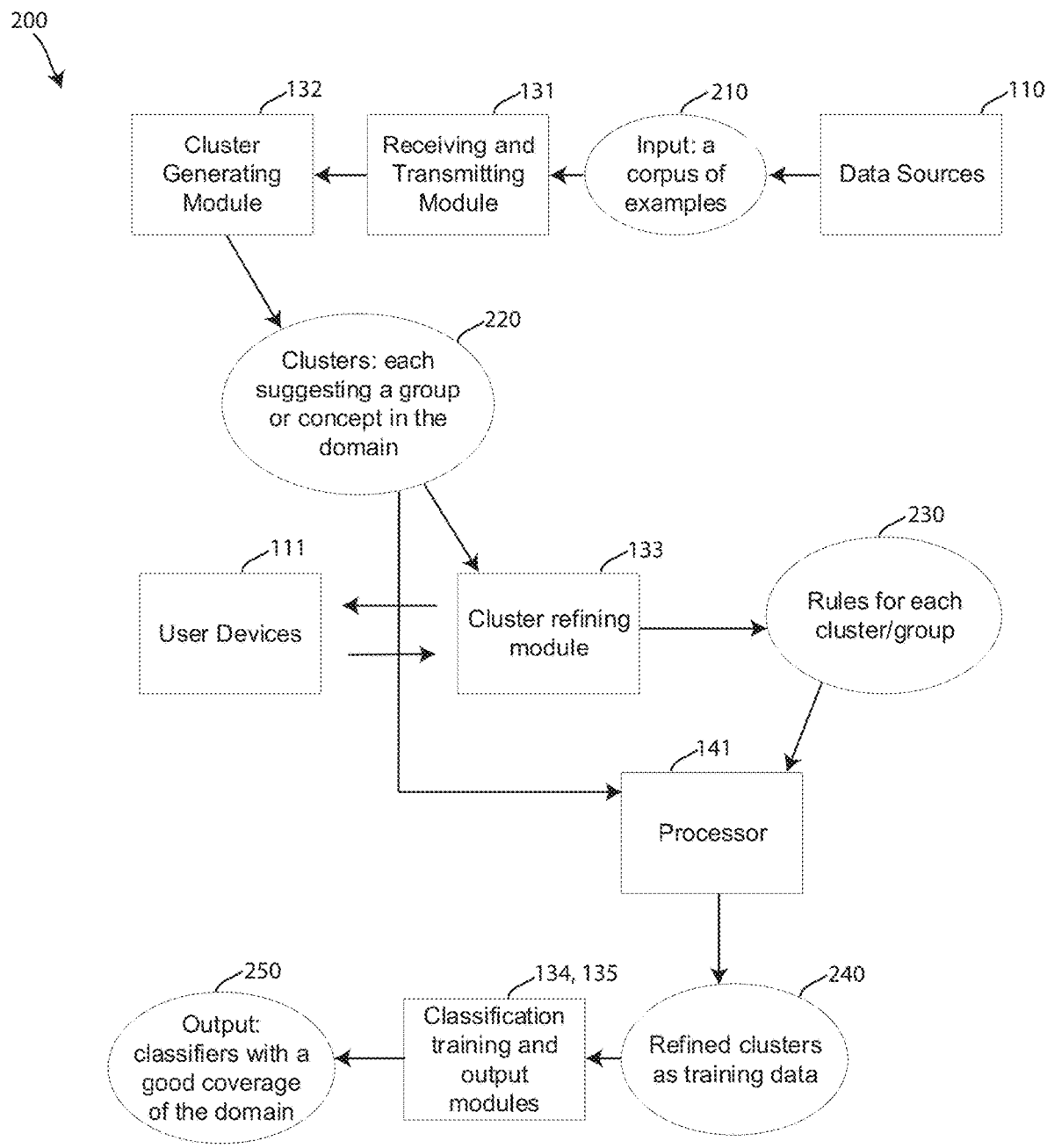
FIG. 2 depicts an embodiment of a system architecture for the system for training classifiers used in machine learning of FIG. 1, in accordance with embodiments of the present invention.

FIG. 2 depicts an embodiment of a system architecture 200 for the system for training classifiers used in machine learning 100 of FIG. 1, in accordance with embodiments of the present invention. The system architecture 200 includes the one or more data sources 100 first providing an input of a corpus of examples or other data 210 to the receiving or transmitting module 131 of the computer system 120. The receiving and transmitting module 131 provides this information to a cluster generating module 132 to create a plurality of clusters 220 based on user needs. The clusters 220 may each suggest a group or concept n the domain of the input examples 210.

The system architecture 200 includes then subjecting the clusters 220 to a cluster refining process through the cluster refining module 133, which interacts with user devices 111 to elicit or otherwise collect user-defined rules 230 related to the clusters. These rules are processed by the processor 141, which may be a cluster refining processor of the computer system 120. The processor 141 may be configured to refine, update or otherwise use the user provided rules to output refined clusters 140 that will be used as training data by the classification training and output modules 134, 135. The classification training and output modules 134, 135 then provide the output classifiers with good coverage of the domain 250 back to the user and/or user devices 111.

Figure 3:
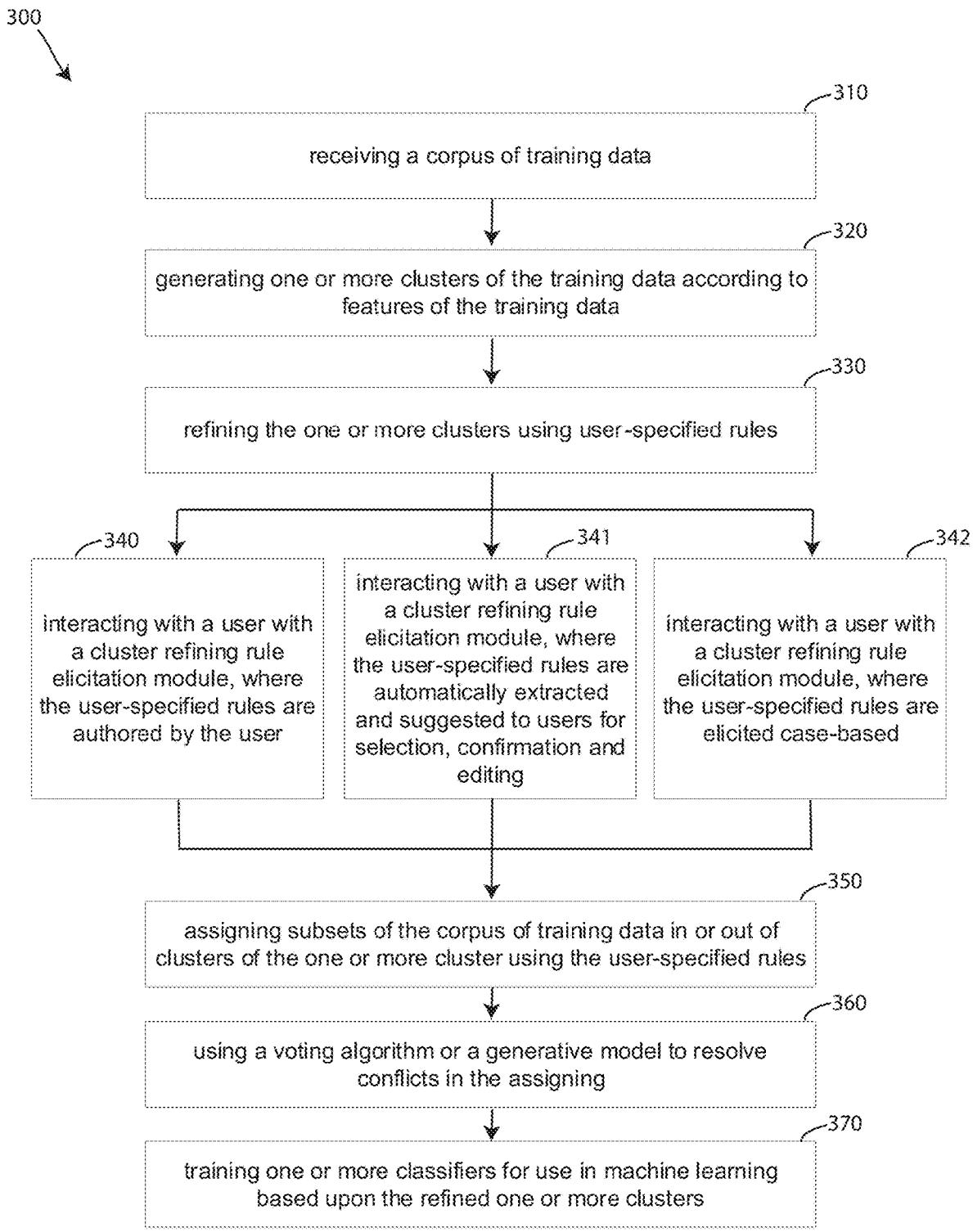
FIG. 3 depicts a method for training classifiers used in machine learning performable by the system of FIG. 1, in accordance with embodiments of the present invention.

FIG. 3 depicts a method 300 for training classifiers used in machine learning performable by the system of FIG. 1, in accordance with embodiments of the present invention. The method 300 includes a first step 310 of receiving a corpus of training data by, for example, one or more processors of a computer system, such as the computer system 120. This corpus of training data may be sent by one or more data sources and/or user devices, such as the data sources 110 and/or the user devices 111. The step 310 may be, for example, performable by the receiving and transmitting module 131 of the module structure 130 of the computer system 120. The method includes a next step 320 of generating one or more clusters of the training data according to features of the training data. The step 320 may be performable by, for example, the cluster generating module 132 of the module structure 130 of the computer system 120. The step 320 may include allowing a user define clusters based on user needs, and may include allowing the user to specify the number of clusters, split clusters, merge clusters, and remove clusters.

The method 300 may include a next step 330 of refining the one or more clusters using user-specified rules. The step 330 may be performable by the cluster refining module 133 of the module structure 130 of the computer system 120. The refining step 330 may additionally and/or alternatively include one or more of the following steps 340, 341, 342. For example, the refining step 330 may further include a step 340 of interacting with a user with a cluster refining rule elicitation module or submodule, where the user-specified rules are then authored by the user. The refining step 330 may additionally and/or alternatively include a step 341 of interacting with a user with a cluster refining rule elicitation module, where the user-specified rules are automatically extracted and suggested for selection, confirmation, and editing. The refining step may additionally and/or alternatively include a step 342 of interacting with a user with a cluster refining rule elicitation module where the user-specified rules are elicited in a case-based manner.

The method 300 may then include the step 350 of assigning subsets of the corpus of training data in or out of clusters of the one or more cluster using the user-specified rules. The method 300 may then include the step 360 of using a voting algorithm or a generative model to resolve conflicts in the assigning of the subsets of the corpus in or out of the clusters. The method then includes a step 370 of training one or more classifiers for use in a machine based upon the refined one or more clusters. The step 370 may be performable by, for example, the classifier training module 134.

The method 300 may include additional steps such as outputting the classifier with good coverage of a domain. The method 300 may further be an iterative method or process in which, if a user is not satisfied, may repeat some or all of steps 330, 340, 341, 342, 343, 344 in providing more or different user rules and re-running the cluster updating process to refine the clusters.

Figure 4:
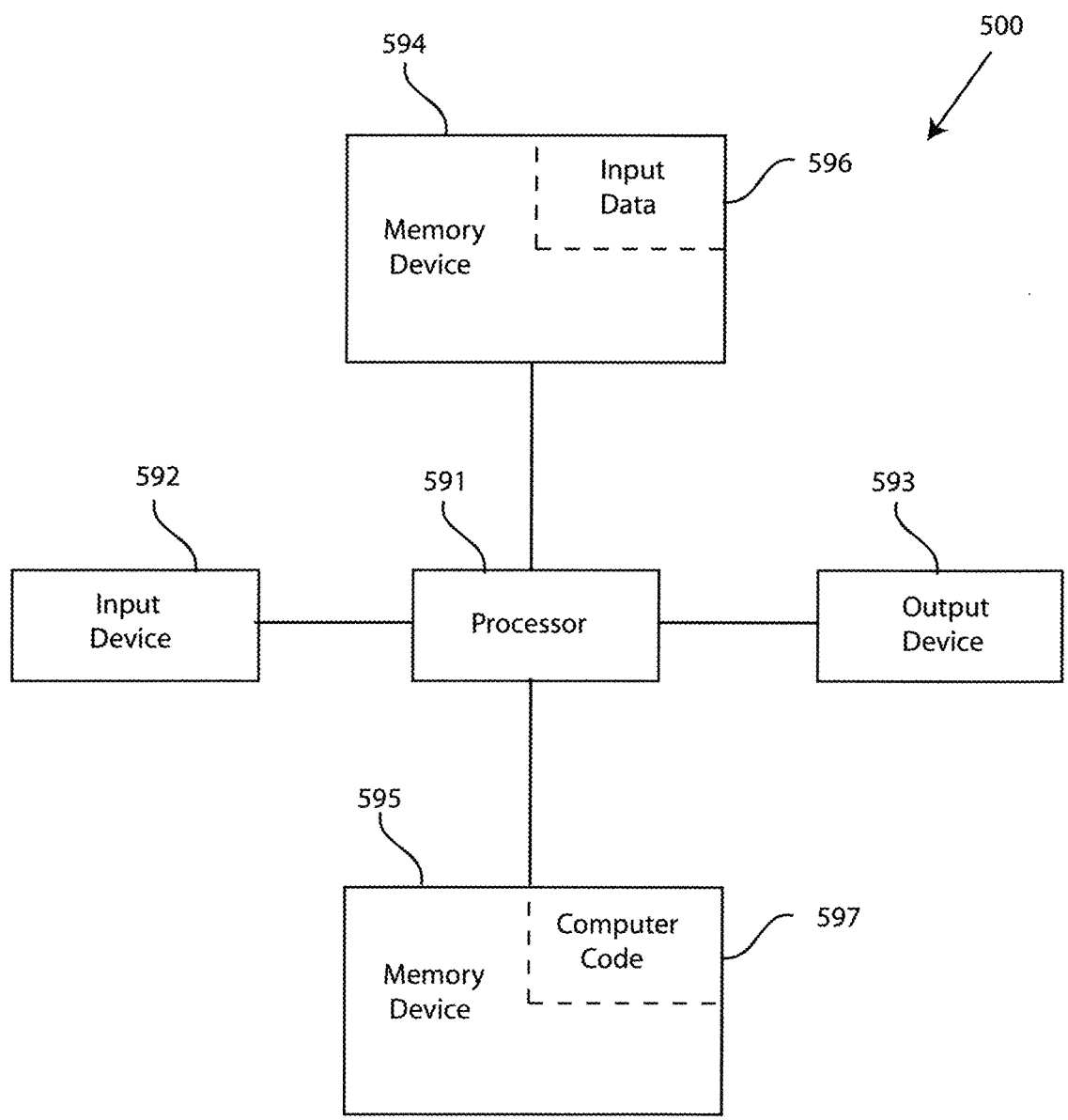
FIG. 4 depicts a block diagram of an exemplary computer system that may be included in the system for defining classes and generating classifiers of FIG. 1, capable of implementing process flows and methods for training classifiers used in machine learning of FIG. 3, in accordance with embodiments of the present invention.

FIG. 4 depicts a block diagram of an exemplary computer system that may be included in the system for training classifiers used in machine learning 100 of FIG. 1, capable of implementing methods and process flows for training classifiers used in machine learning of FIG. 3, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing method and processes for training classifiers used in machine learning in the manner prescribed by the embodiment of FIG. 3 using one, some or all of the system for training classifiers used in machine learning 100 of FIG. 1, wherein the instructions of the computer code 597 may be executed by processor 591 via memory device 595. The computer code 597 may include software or program instructions that may implement one or more algorithms for implementing the methods and processes for training classifiers used in machine learning, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 4.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. r in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information data or program instructions such as program code 597) on and retrieve the information from one or more computer data storage units (not shown). The one or more computer data storage units include a known computer-readable storage medium, which is described below. In one embodiment, the one or more computer data storage units may be a non-volatile data storage device, such as a magnetic disk drive (i.e., hard disk drive) or an optical disc drive (e.g., a CD-ROM drive which receives a CD-ROM disk). In other embodiments, the one or more computer data storage unit may include a knowledge base or data repository 125, such as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform the method for training classifiers used in machine learning. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for training classifiers used in machine learning. Thus, the present invention discloses a process for supporting, deploying and/or integrating computer infrastructure, integrating, hosting, maintaining, and deploying computer-readable code into the computer system 500, wherein the code in combination with the computer system 700 is capable of performing a method for training classifiers used in machine learning.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing, device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
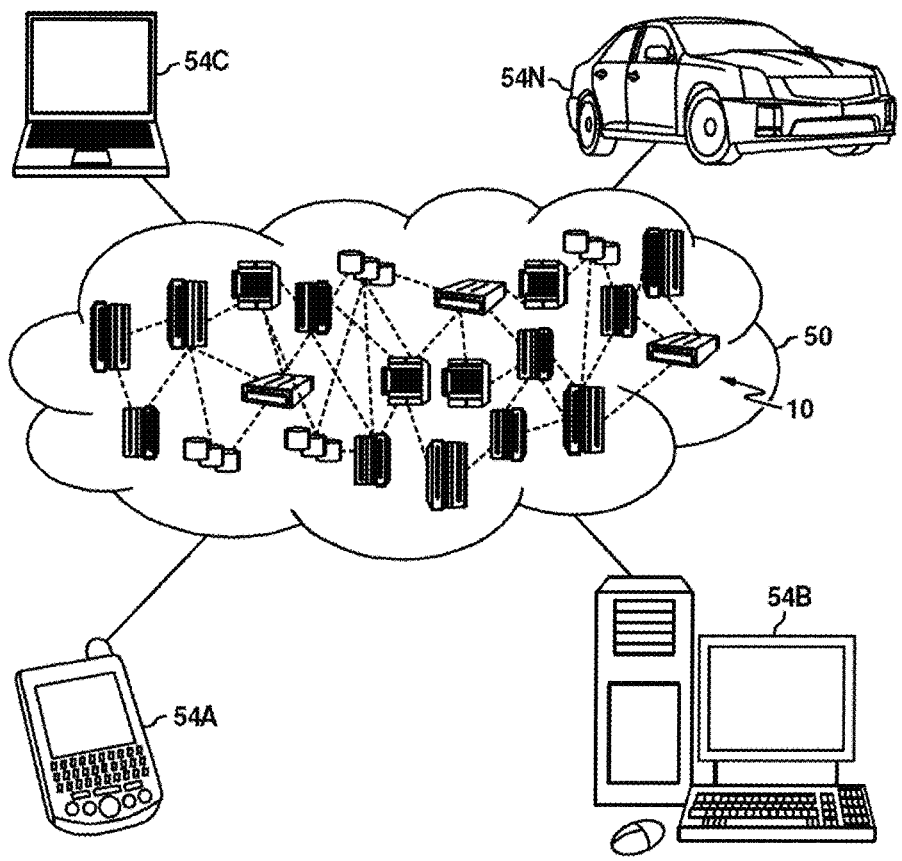
FIG. 5 depicts a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers or users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
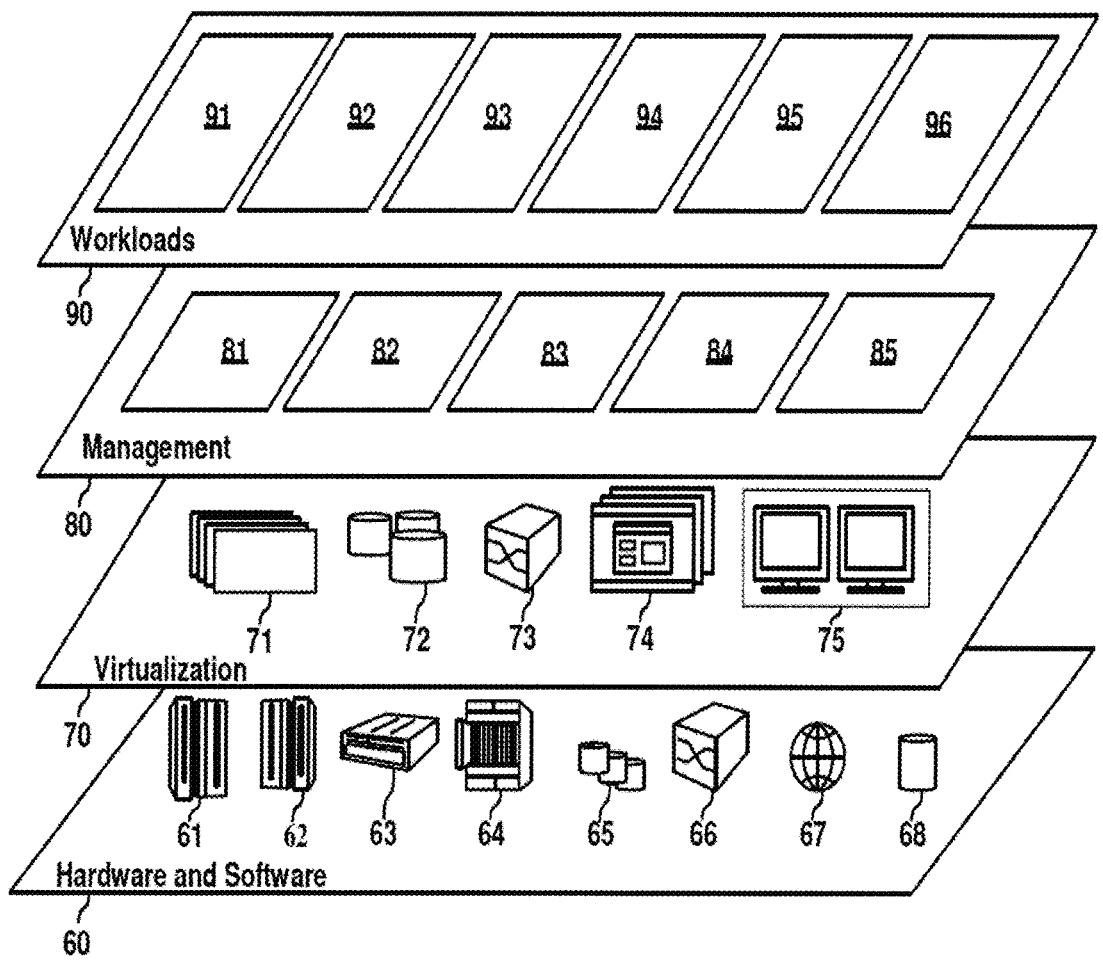
FIG. 6 depicts abstraction model layers, in accordance with embodiments of the present invention.

Referring now to FIG. 6, a set of functional abstraction layers provided by cloud computing environment 50 (see FIG. 5) are shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training classifiers used in machine learning 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training classifiers used in machine learning, the method comprising:
   receiving, by one or more processors of a computer system, a corpus of training data;
   generating, by the one or more processors of the computer system, one or more clusters of the training data according to features of the training data;
   comparing, by a cluster refining rule elicitation module of the computer system, neighboring clusters of the one or more clusters to automatically extract boundary rules for suggestion of a user for selection, confirmation and/or editing;
   interacting with the user, by the cluster refining rule elicitation module of the elicit user-specified rules by suggesting the extracted boundary rules;
   automatically refining, by the one or more processors of the computer system, the one or more clusters using the user-specified rules, wherein the refining further includes: assigning subsets of the corpus of training data in or out of clusters of the one or more clusters using the user-specified rules, and using a generative model to resolve conflicts in the assigning; and
   training, by one or more processors of a computer system, multiple classifiers for use in machine learning based upon the refined one or more clusters.

2. The method of claim 1, wherein the user-specified rules are authored by the user.

3. The method of claim 1, wherein the user-specified rules are automatically extracted and suggested to users for selection, confirmation and editing.

4. The method of claim 1, wherein the refining further includes: interacting with a user with a cluster refining rule elicitation module, wherein the user-specified rules are elicited case-based.

5. The method of claim 1, wherein the refining and the training are implemented by the one or more processors of the computer system in a single process.

6. The method of claim 1, wherein the one or more clusters represent classes of the training data.

7. A computer system, comprising:
   one or more processors;
   one or more memory devices coupled to the one or more processors;
   and one or more computer readable storage devices coupled to the one or more processors, wherein the one or more storage devices contain program code executable by the one or more processors via the one or more memory devices to implement a method for training classifiers in machine learning, the method comprising:
   receiving, by the one or more processors of the computer system, a corpus of training data;
   generating, by the one or more processors of the computer system, one or more clusters of the training data according to features of the training data;
   comparing, by a cluster refining rule elicitation module of the computer system, neighboring clusters of the one or more clusters to automatically extract boundary rules for suggestion of a user for selection, confirmation and/or editing;
   interacting with the user, by the cluster refining rule elicitation module of the computer system, to elicit user-specified rules by suggesting the extracted boundary rules; automatically refining, by the one or more processors of the computer system, the one or more clusters using the user-specified rules, wherein the refining further includes: assigning subsets of the corpus of training data in or out of clusters of the one or more cluster using the user-specified rules; and using a generative model to resolve conflicts in the assigning; and
   training, by one or more processors of a computer system, multiple classifiers for use in machine learning based upon the refined one or more clusters.

8. The computer system of claim 7, wherein the user-specified rules are authored by the user.

9. The computer system of claim 7, wherein the user-specified rules are automatically extracted and suggested to users for selection, confirmation and editing.

10. The computer system of claim 7, wherein the refining further includes: interacting with a user with a cluster refining rule elicitation module, wherein the user-specified rules are elicited case-based.

11. The computer system of claim 7, wherein the refining and the training are implemented by the one or more processors of the computer system in a single process.

12. The computer system of claim 7, wherein the one or more clusters represent classes of the training data.

13. A computer program product, comprising one or more computer readable hardware storage devices storing a computer readable program code, the computer readable program code comprising an algorithm that when executed by one or more processors of a computing system implements a method for training classifiers in machine learning, the method comprising:
   receiving, by the one or more processors of the computer system, a corpus of training data;
   generating, by the one or more processors of the computer system, one or more clusters of the training data according to features of the training data;
   comparing, by a cluster refining rule elicitation module of the computer system, neighboring clusters of the one or more clusters to automatically extract boundary rules for suggestion of a user for selection, confirmation and/or editing;
   interacting with the user, by the cluster refining rule elicitation module of the computer system, to elicit user-specified rules by suggesting the extracted boundary rules; automatically refining, by the one or more processors of the computer system, the one or more clusters using the user-specified rules, wherein the refining further includes: assigning subsets of the corpus of training data in or out of clusters of the one or more cluster using the user-specified rules; and using a generative model to resolve conflicts in the assigning; and
   training, by one or more processors of a computer system, multiple classifiers for use in machine learning based upon the refined one or more clusters.

14. The computer program product of claim 13, wherein the user-specified rules are authored by the user.

15. The computer program product of claim 13, wherein the user-specified rules are automatically extracted and suggested to users for selection, confirmation and editing.

16. The computer program product of claim 13, wherein the refining further includes: interacting with a user with a cluster refining rule elicitation module, wherein the user-specified rules are elicited case-based.

17. The computer program product of claim 13, wherein the refining and the training are implemented by the one or more processors of the computer system in a single process.

* * * * *